July 13, 1965 E. E. HENSEL 3,194,366

SELF-BRAKING DRIVING DEVICE FOR AN OPERATING SHAFT

Filed June 11, 1962 3 Sheets-Sheet 1

INVENTOR
Erich E. Hensel

BY Stevens, Davis, Miller & Mosher
ATTORNEYS

July 13, 1965     E. E. HENSEL     3,194,366

SELF-BRAKING DRIVING DEVICE FOR AN OPERATING SHAFT

Filed June 11, 1962     3 Sheets-Sheet 2

INVENTOR

Erich E. Hensel

BY Stevens, Davis, Miller & Mosher

ATTORNEYS

July 13, 1965   E. E. HENSEL   3,194,366
SELF-BRAKING DRIVING DEVICE FOR AN OPERATING SHAFT
Filed June 11, 1962
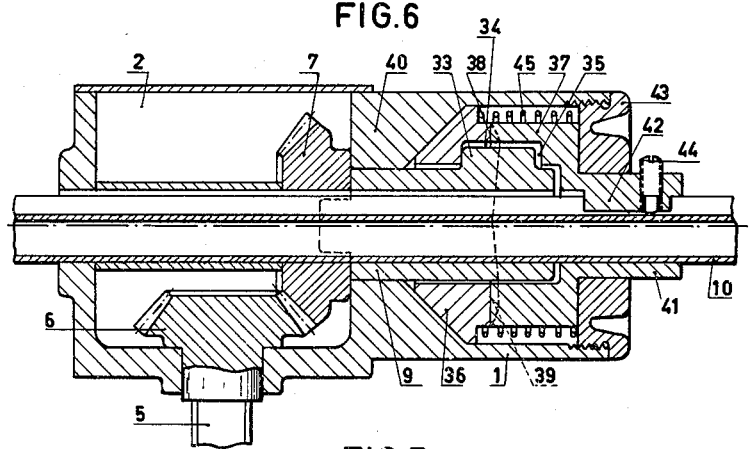
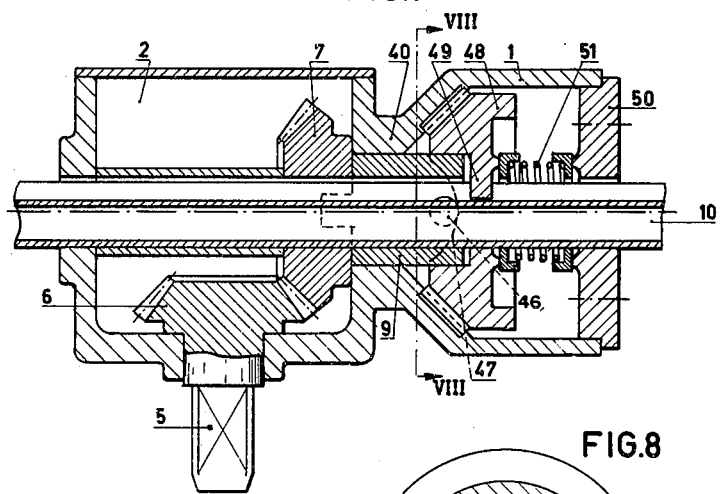
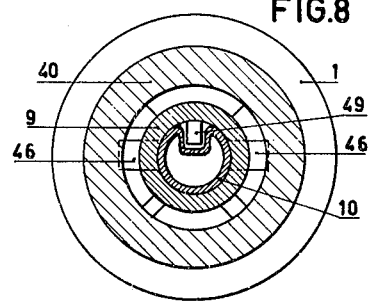
INVENTOR
Erich E. Hensel
BY Stevens, Davis, Miller & Mosher
ATTORNEYS

United States Patent Office 3,194,366
Patented July 13, 1965

3,194,366
SELF-BRAKING DRIVING DEVICE FOR AN OPERATING SHAFT
Erich Emil Hensel, The Hague, Netherlands, assignor to Hunter Douglas International (Quebec) Limited, Montreal, Quebec, Canada, a corporation of Canada
Filed June 11, 1962, Ser. No. 201,475
Claims priority, application Netherlands, June 9, 1961, 265,739
1 Claim. (Cl. 192—8)

This invention relates to a self-braking driving device for a Venetian blind, a rolling-shutter or the like, over which there extends an operating shaft driven by a driving device, said driving device comprising a housing accommodating a braking device which becomes operative when the weight of the Venetian blind or the like exercises a torque on the operating shaft and becomes inoperative when the operating shaft is driven by the driving device.

The self-braking driving devices of this kind known so far present the difficulty that they are of complicated construction and, moreover, the locking device does not become operative rapidly enough when the driving device is not driven any longer so that consequently the Venetian blind or the rolling-shutter lowers itself over a considerable distance. The self-braking device according to the invention avoids these difficulties in that said braking device comprises two co-operating parts mounted on the operating shaft and destined to put the braking device into and out of operation, the first part of which being nonrotatable relative to the operating shaft and the second part being rotatable over a small angle relative to the operating shaft and to the first part, said relative rotatory movement of both parts putting the braking device into or out of operation. The self-braking driving device according to the invention presents the additional advantage that it requires little extra space since the majority or all of the parts may be mounted in the head rail of the Venetian blind or the rolling-shutter or in the prolongation of said head rail and, moreover, said device may be accommodated at any point in the head rail. A further advantage of the self-braking driving device according to the invention is that all parts may be of robust construction.

A preferred embodiment of the self-braking driving device according to the invention is characterized in that on the operating shaft there is arranged a tubular part coupled with the driving device, said tubular part being rotatably mounted in the housing and comprising one or more projections engaging with both parts with clearance. The magnitude of this clearance may be easily controlled since this depends upon the dimensions of the projections and the recesses. Since one may select a small clearance the locking device may rapidly become operative.

The braking device may be constructed as a friction coupling of which a wall portion of the housing serves as a friction surface.

A preferred embodiment of the self-braking driving device is characterized in that the surfaces facing each other of both co-operating parts are provided with one or more cams or raised portions having slightly inclined surfaces. These cams are preferably symmetrical so that consequently the self-braking device is adapted to be utilized for driving devices mounted at the left hand side as well as the right hand side of the Venetian blind or rolling-shutter.

The self-braking driving device may also be of such construction that the part which is rotatable over a small angle relative to the operating shaft consists of a disc having at its circumference a plurality of recesses, the part which is non-rotatable relative to the operating shaft being constructed as a cage in which a number of rollers corresponding with the recesses of the disc are provided, said rollers being located between the disc and the cylindrical inner wall of the housing.

If desired one or more springs may be provided in the braking device which acts or act directly or indirectly on the part provided with a braking surface. If the braking action is accomplished in that both co-operating parts are clamped in the housing between the cover and the braking surface, these springs are weak springs so that in the non-operative position of the braking device these springs do not exercise an inconvenient braking action.

If this spring or these springs are to supply the braking action, then, of course, these spirngs are strong springs.

The invention will be explained below with reference to the accompanying drawings showing by way of example some embodiments of the self-braking driving device according to the invention.

FIG. 6 is a longitudinal section of a third embodiment.

FIG. 7 shows a fourth embodiment in longitudinal section.

FIG. 8 is a section according to the line VIII—VIII of FIG. 7.

Figure 1:
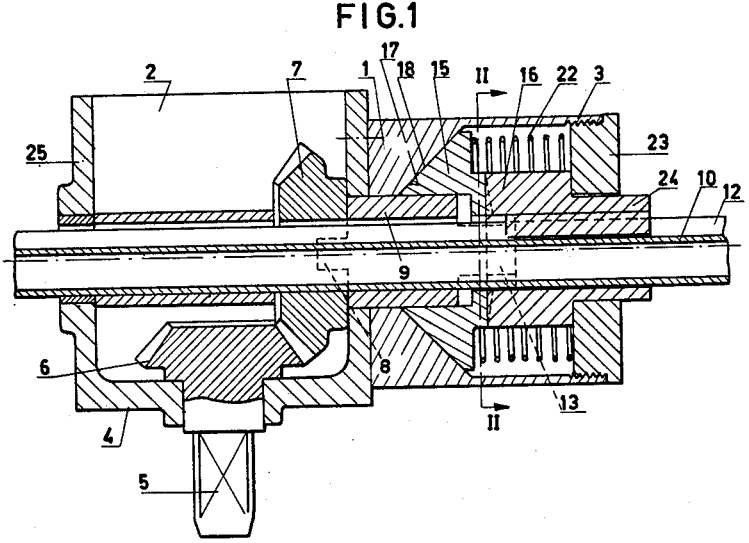
FIG. 1 shows a longitudial section of the first embodiment of the driving device.
Figure 2:
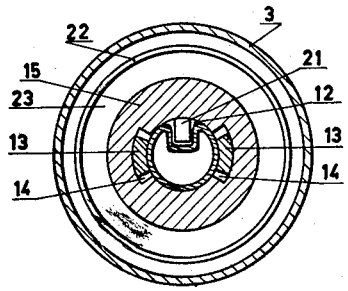
FIG. 2 is a section according to the line II—II of FIG. 1.
Figure 3:
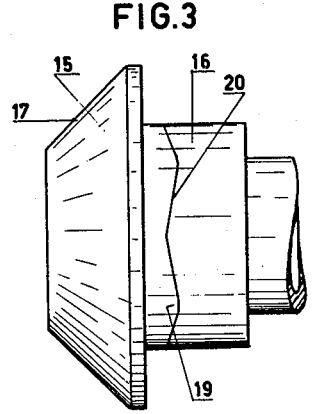
FIG. 3 shows a side view of a detail.

The self-braking driving device shown in FIGS. 1–3 comprises a housing which is subdivided by a partition wall into two portions 2 and 3. In the bottom 4 of the housing portion 2 there is rotatably mounted a driving end 5 which at its end projecting into the housing portion 2 carries a bevel gear wheel 6. This bevel gear wheel is in engagement with a bevel gear wheel 7 which by means of lips 8 is coupled with a tubular part 9 mounted in the partition wall 1 and freely rotatable about a shaft 10, this shaft constituting the operating shaft of the Venetian blind, rolling-shutter or similar closing means. This operating shaft is hollow and comprises a groove 12 extending in the longitudinal direction. The tubular part projecting into the housing portion 3 has two projections 13 disposed diametrically relative to one another. These projections 13 engage with arcuate recesses 14 of two parts 15 and 16 of a braking device, of which the part 15 has a friction surface 17 co-operating with a friction surface 18 provided in the housing portion 3. The surfaces of parts 15 and 16 facing each other each have cams 19 and 20 respectively with slightly inclined flanks which are in engagement with one another and are of symmetrical shape. Consequently this driving arrangement may be provided at the left hand side as well as the right hand side of a Venetian blind or rolling-shutter. Should said cams not be symmetrical, then it would be necessary to design individual self-braking driving devices for the left hand and the right hand side. Part 16 is provided at its inner side with a projection 21 engaging the groove-like recess 12 of the operating shaft 10. Consequently part 16 cannot rotate about the shaft. Part 15 is being urged by a weak spring 22 towards part 16. This spring abuts at its other end against a cover or closure plate 23 of the housing portion 3, said cover being secured by means of a screw thread in the housing portion 3. In this cover there is inserted a tubular part 24 belonging to part 16, said tubular part 24 serving as a bearing for the shaft 10. This shaft is also mounted in the tubular part 9 as well as in the end wall 25 of the housing portion 2 so that consequently this operating shaft is satisfactorily supported.

The above-described device operates as follows:

If the driving end 5 is rotated, the bevel gear wheels 6 and 7 are driven. The bevel gear wheel drives the tubular part 9 which via the projections 13 drives both parts 15 and 16. Part 16 engages with its projection 21 with the groove 12 of the operating shaft 10 so that the latter is rotated. As a consequence thereof the blind or rolling-shutter will be raised or lowered according to the direction in which the driving end is rotated.

If one does not drive the driving end 5 any longer, the weight of the Venetian blind or rolling-shutter will rotate the shaft 10. Consequently part 16 will rotate so that the cams 20 will run on the cams 19 and part 16 urges the friction surface 17 of part 15 against the friction surface 18 provided in the housing portion 3, since part 16 abuts with its rear face against the inner face of cover 23. However, part 16 cannot rotate freely relative to part 15 since the projections 13 engage with the recesses 14 provided in both parts. If part 16 rotates relative to part 15 the projections 13 will abut against the end edges of the recesses 14 thus rendering impossible a further rotation of both parts. By giving the recesses a small width the operating shaft 10 will be rapidly braked so that the Venetian blind or rolling-shutter may lower itself only over a negligible distance.

Figure 4:
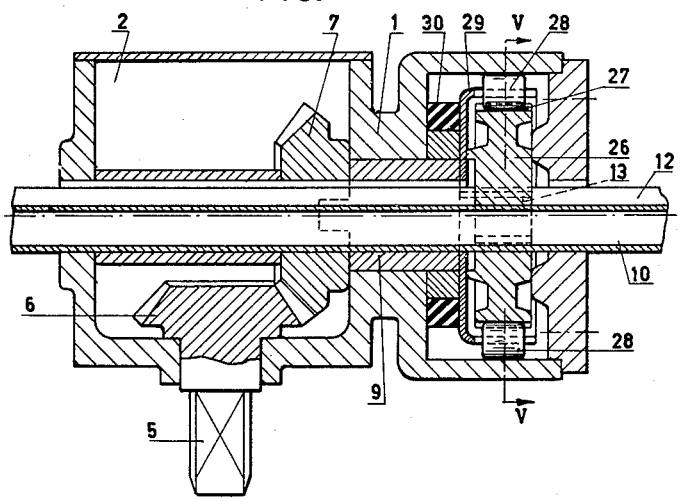
FIG. 4 shows a longitudinal section of a second embodiment.
Figure 5:
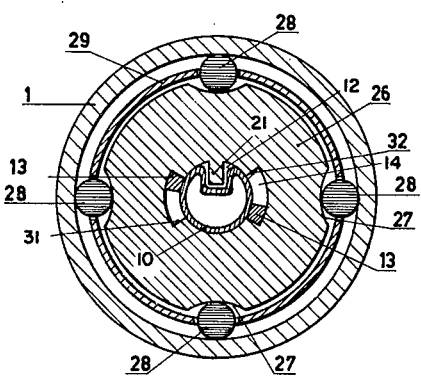
FIG. 5 is a section according to the line V—V of FIG. 4.

In the embodiment according to FIGS. 4 and 5 the projections 13 of the tubular part 9 engage with recesses 14 of a disc 26 having four flattened surfaces 27 of concave arcuate shape. Rollers 28 co-operate with these flattened surfaces, said rollers being adapted to rotate in a cage 29 mounted on the shaft 10. These rollers co-operate with the inner wall of the housing 1. The cage 29 abuts against a rubber block 30.

The above-described device operates as follows:

If the driving end 5 is rotated the gear wheels 6 and 7 are driven. The gear wheel 7 drives the tubular part 9 which, via the projections 13, drives the disc 26 and the cage 29. The disc 26 engages by means of a projection 21 with the groove 12 of the operating shaft 10 so that the latter is rotated. Consequently the blind or rolling-shutter will be raised or lowered according to the direction in which the driving end 5 is rotated.

If one does not drive the driving end 5 any longer, the weight of the blind or the rolling-shutter will rotate the shaft 10. Consequently the disc 26 will rotate so that the projections 13 are rotated until they abut against the walls 31 and 32 of the recesses 14. The disc 26 therefore rotates over a small angle relative to the cage 29 and consequently the rollers 28 move over the flattened surfaces 27 and are clamped between the inner wall of the housing 1 and the disc 26 thus preventing a further rotation of the shaft 10.

The embodiment according to FIG. 6 is shown in the position in which the brake is operative. In this embodiment there is provided on the cylindrical surface of the tubular part 9 a projection 33 with clearance in recesses 34 and 35 of two co-operating parts 36 and 37 so that the tubular part 9 and the parts 36 and 37 may rotate over a small angle relative to each other. Parts 36 and 37 are arranged in the prolongation of each other and their faces facing each other comprise cams or raised portions 38 and 39 respectively. Part 36 is provided with a braking surface co-operating with a friction surface provided in a partition wall 40 of the housing 1. Part 37 has a tubular extension 41 provided with a projection 42 accommodated in the groove of the hollow shaft 10 and mounted in a closure plate or cover 43. This extension is locked in the groove with a bolt 44. Between the cover 43 and the part 36 there is provided a spring 45.

The above-described embodiment operates as follows:

If the driving end 5 is rotated the gear wheels 6 and 7 are driven. The gear wheel 7 drives the tubular part 9 which by means of its projection 33 drives the parts 36 and 37. As a result thereof the cams or raised portions 38 and 39 respectively will engage with each other so that no braking action is exercised and the blind or rolling-shutter may be raised or lowered according to the direction in which the driving end is rotated.

If the driving end 5 is not driven any longer the weight of the blind or the rolling-shutter will cause the shaft 10 to rotate. The part 37 which with its projection 42 is located in the groove of the operating shaft 10 is taken along so that consequently the cams or raised portions 39 of this part rotate relative to the cams or part 36 and said part 36 is urged against the partition wall so that the device assumes the position shown in FIG. 6 in which the braking surfaces of the braking device are firmly pressed together thus preventing a further rotation of the operating shaft.

FIGS. 7 and 8 present a fourth embodiment in part. In this embodiment there are provided on the mantle of the tubular part 9 two projections 46, 46 co-operating with recesses 47 of a part 48 provided with a braking surface, said part 48 having a projection 49 which is accommodated in a groove of the hollow shaft 10. Between the part 48 and a cover 50 there has been provided a spring 51 urging the part 48 against the partition wall 40 of the housing 1. The tubular part 9 is provided again with projections arranged with clearance in a recess of the part 48. The device is shown in the position in which the operating shaft is braked. When the driving end 5 is rotated the gear wheels 6 and 7 will rotate the tubular part 9 so that consequently the projections 46 are moved in the recess 47 and press the part 48 away from the braking surface in the housing 1 so that the blind or rolling-shutter is lowered or raised according to the direction in which the driving end 5 is rotated.

It is obvious that the invention is not restricted to the embodiment described above and shown in the drawings but that they may be modified in numerous ways without departing from the scope of the invention.

I claim:

A self-braking driving device for a Venetian blind, a rolling-shutter, and the like, comprising an operating shaft and a driving means, said shaft being drivingly connected to said driving means, said device comprising a housing and a braking means within said housing, said braking means comprising two co-operating parts mounted on said operating shaft, a braking surface on one of said parts and a braking surface on said housing, said surfaces co-operating with each other, the other of said parts being non-rotatably mounted relative to said shaft, said one of said co-operating parts being rotatable only over a small angle relative to said shaft and relative to said other part, a tubular member mounted on said shaft and rotatably mounted on said housing, said member being drivingly coupled to said driving means and having at least one projection, recesses in both said co-operating parts, said projection extending into said recesses and said recesses providing a certain amount of clearance between said projection and said co-operating parts, said clearance allowing for a certain amount of lost motion between said projection and said co-operating parts, mutually engaging cam faces on said co-operating parts, said cam faces including elevations and depressions.

References Cited by the Examiner

UNITED STATES PATENTS

| | | | |
|---|---|---|---|
| 903,805 | 11/08 | Wuest | 192—15 |
| 1,634,861 | 7/27 | Weymann | 192—8 |
| 2,561,159 | 7/51 | Walton | 192—8 |
| 2,783,861 | 3/57 | Jungles | 192—8 |
| 2,971,619 | 7/51 | Koslo | 192—8 |

DAVID J. WILLIAMOWSKY, *Primary Examiner.*

ROBERT C. RIORDON, *Examiner.*